3,716,410
LITHIUM BATTERY ELECTROLYTE ADDITIVE AND METHOD OF IMPROVING DISCHARGE RATE

James N. Butler, Wayland, and David R. Cogley, Holliston, Mass., assignors to the United States of America as represented by the Secretary of the Air Force
No Drawing. Filed Sept. 27, 1971, Ser. No. 184,224
Int. Cl. H01m 11/00
U.S. Cl. 136—6                                    4 Claims

ABSTRACT OF THE DISCLOSURE

A method for improving the discharge rate of lithium batteries by adding a small amount of a hexamethyl phosphoramide (hexamethyl-phosphoric triamide; Chemical Abstracts Registery No. 680-31-9) additive to the lithium perchlorate-propylene carbonate (carbonic acid, cyclic propylene ester; Chemical Abstracts Registry No. 108-32-7) electrolyte of the battery.

BACKGROUND OF THE INVENTION

This invention relates to an electrochemical cell of the type that utilizes a lithium metal electrode and a non-aqueous electrolyte. More particularly, this invention relates to lithium batteries and to the use of an electrolyte additive for increasing the lithium exchange current over long periods of time, thereby increasing the discharge rate of the battery.

Lithium batteries are well-known high energy density power supplies. They are especially useful for those applications requiring minimum weight, minimum maintenance and a relatively long shelf-life. However, some difficulty is encountered during their operation because of lithium passivation. The passivation problem is especially serious when using lithium perchlorate-propylene carbonate as the non-aqueous electrolyte for the battery. It occurs at long times and the exchange current of the lithium reaction becomes very small. The exchange current is a determining factor in the discharge rate of the battery and if it can be increased then the discharge rate can be favorably increased.

During studies of the kinetics of lithium electrodes in non-aqueous electrolytes, it was discovered that the addition of small amounts of hexamethyl phosphoramide to a LiClO$_4$-propylene carbonate electrolyte increased the lithium exchange current at long times thereby increasing the discharge rate of the lithium battery.

SUMMARY OF THE INVENTION

In accordance with this invention it has been found that the discharge rate of lithium batteries can be significantly increased by the addition of hexamethyl phosphoramide to the battery electrolyte. Passivation of lithium in propylene carbonate, the usual electrolyte for lithium batteries, occurs at long times and the exchange current becomes small with a resultant decrease in the battery discharge rate. With the addition of about 9.8 percent by weight of hexamethyl phosphoramide to the electrolyte, the exchange current was approximately twice as much as that in similar electrolytes which were not doped with hexamethyl phosphoramide.

Accordingly, the primary object of this invention is to provide an improved electrochemical power source of the lithium type.

Another object of this invention is to provide an additive that will increase the discharge rate of lithium batteries.

Still another object of this invention is to provide a means for minimizing the passivation of lithium electrodes when immersed in a propylene carbonate electrolyte.

The above and still other objects and advantages of this invention will become more readily apparent upon consideration of the following detailed description thereof.

DESCRIPTION OF THE PREFERRED EMBODIMENT

The realization and attainment of the objects of this invention are obtained by adding a small amount of a hexamethyl phosphoramide additive to the electrolyte of a lithium battery. The additive minimizes the passivation which occurs when the lithium electrode is immersed in the battery electrolyte.

In general these batteries utilize a lithium negative electrode in combination with a positive electrode and an organic non-aqueous electrolyte. The positive electrode may be selected in accordance with considerations well known in this art. These materials are characterized by the ease with which they accept electrons. Such materials are well known and include heavy metals, like mercurous sulfate, mercuric sulfate, lead sulfate, and the like; halides, like cupric chloride, cupric fluoride, nickelous fluoride, and the like; halogenated organic compounds, like sodium dichloroisocyanurate; sulfides, like cupric sulfide; and oxides, like manganese dioxide, nickel dioxide, lead dioxide, silver oxide, vanadium pentoxide, stannic oxide, and the like. Since the material itself is normally nonconductive there may be associated therewith a cathecter, like carbon, silver, nickel or platinum, which is inert to the electrolyte and serves to conduct current to the electrode terminal. Finely-divided inert conductive material may also be intimately mixed with the cathode material.

A number of non-aqueous electrolytes for use with lithium batteries are likewise well known and include a wide combination of solute and solvent materials. One combination which has been found to be especially useful comprises lithium perchlorate as the solute and propylene carbonate as the solvent. However, in investigating the kinetics of a lithium metal electrode in a non-aqueous propylene carbonate electrolyte, it was determined that passivation could be minimized by adding about 0.8 percent by weight of hexamethyl phosphoramide to a lithium perchlorate-propylene carbonate electrolyte. This results in increasing the exchange current rate which also results in an increase in the discharge rate.

To illustrate the above, a comparison was made between the exchange currents of lithium when immersed in a 0.2 M lithium perchlorate-propylene carbonate electrolyte and when immersed in the same electrolyte containing 0.8 weight percent hexamethyl phosphoramide. It was found that the additive of this invention produced an increased discharge rate for the lithium battery. The comparison is based on experimental results tabulated in Tables I, II and III.

In Table I, the oscillograph tracings show that the hexamethyl phosphoramide doped electrolyte had initial exchange currents that were about 15 percent higher than in the undoped electrolyte of Table II.

After one hour, the hexamethyl phosphoramide doped electrolyte gave an exchange current approximately twice that of the undoped electrolyte.

Table III discloses oscilloscope tracings that indicate a lithium perchlorate-propylene carbonate electrolyte containing only a small amount of water showed a decrease in exchange current to less than 0.1 ma./cm.$^2$ after 25 minutes. The hexamethyl phosphoramide doped electrolyte showed an exchange current greater than 1 ma./cm.$^2$ after 15 hours. Compare trace 282 of Table III with trace 369 of Table I. This indicates that hexamethyl phosphoramide is very effective at preventing the passivation of lithium at long time in the presence of small amounts of water.

Table IV discloses results obtained by testing the two electrode lithium cell used in evaluating the electrolyte of this invention.

TABLE I

[Electrolyte: 0.2551 M LiClO$_4$ and .04557 M HMPA in PC (0.810 wt. percent HMPA) (<0.5 mm. water)]

| Trace No. | I (ma.) | E (mv.) | $\eta_c$ (mv.) | $i_a{}^o$ (ma./cm.$^2$) | Time | Comment |
|---|---|---|---|---|---|---|
| 349 | 2.238 | 44.62 | 18.36 | 8.324 | 1 second | |
| 350 | 2.227 | 56.50 | 22.15 | 6.585 | 5 seconds | |
| 351 | 2.238 | 62.57 | 23.96 | 5.991 | 15 seconds | |
| 352 | 2.238 | 67.26 | 25.32 | 5.583 | 20 seconds | |
| 353 | 2.238 | 74.06 | 27.22 | 5.079 | 25 seconds | |
| 354 | 2.232 | 69.37 | 25.91 | 5.403 | 30 seconds | |
| 355 | 2.238 | 73.20 | 26.98 | 5.138 | 35 seconds | |
| 356 | 2.238 | 83.70 | 29.81 | 4.495 | 1 minute 30 seconds | |
| 357 | 2.232 | 84.78 | 30.09 | 4.427 | 2 minutes | |
| 358 | 2.237 | 86.94 | 30.66 | 4.326 | 2 minutes 30 seconds | |
| 359 | 2.238 | 88.04 | 30.94 | 4.271 | 3 minutes | |
| 360 | 2.238 | 93.73 | 32.40 | 4.006 | 4 minutes 20 seconds | |
| 361 | 2.238 | 94.30 | 32.55 | 3.981 | 5 minutes 20 seconds | |
| 362 | 2.232 | 94.20 | 32.52 | 3.975 | 6 minutes | 22.3° C. |
| 363 | .939 | 41.95 | 17.46 | 3.708 | 8 minutes 45 seconds | (a). |
| 364 | .936 | 45.95 | 18.80 | 3.385 | 22 minutes | |
| 365 | .916 | 54.49 | 21.53 | 2.808 | 51 minutes | |
| 366 | .810 | 128.8 | 41.1 | 1.022 | 14 hours 27 minutes | |
| 367 | .235 | 38.92 | 16.40 | .997 | 14 hours 31 minutes | (a). |
| 368 | .283 | 46.22 | 18.89 | 1.016 | 14 hours 33 minutes | 20.5° C. |
| 369 | .281 | 43.13 | 17.86 | 1.083 | 15 hours 40 minutes | 24.3° C. | a Invariant exchange current verifies assumption of $\alpha=0.72$.
NOTE.—IR compensation used for all traces. R approx. 150 ohm.

TABLE II

[Electrolyte: 0.2572 M LiClO$_4$ in PC; solution dried 2h. over sieves (<0.5 mm. water)]

| Trace No. | I (ma.) | E (mv.) | $\eta_c$ (mv.) | $i_a{}^o$ (ma./cm.$^2$) | Time | Comments |
|---|---|---|---|---|---|---|
| 300 | 1.604 | 46.2 | 19.0 | 5.77 | 1.5 seconds | |
| 301 | 1.615 | 45.6 | 18.7 | 5.88 | 4.9 seconds | |
| 302 | 1.604 | 52.5 | 21.0 | 5.09 | 8.4 seconds | |
| 303 | 1.593 | 57.5 | 22.4 | 4.64 | 11.3 seconds | |
| 304 | 1.593 | 57.5 | 22.4 | 4.64 | 15.0 seconds | |
| 305 | 1.593 | 57.6 | 22.5 | 4.63 | 18.1 seconds | |
| 306 | 1.593 | 59.7 | 23.1 | 4.47 | 21.1 seconds | |
| 307 | 1.593 | 59.7 | 23.1 | 4.47 | 24.1 seconds | |
| 308 | 1.593 | 60.8 | 23.5 | 4.38 | 1 minute 9.8 seconds | |
| 309 | 1.593 | 63.7 | 24.3 | 4.19 | 1 minute 11.9 seconds | |
| 310 | 1.593 | 63.7 | 24.3 | 4.19 | 1 minute 14.5 seconds | |
| 311 | 1.593 | 63.2 | 24.1 | 4.23 | 1 minute 17.4 seconds | |
| 312 | 1.593 | 63.2 | 24.1 | 4.22 | 1 minute 20.4 seconds | |
| 313 | 1.593 | 65.44 | 24.80 | 4.084 | 1 minute 23.3 seconds | |
| 314 | 1.593 | 65.42 | 24.79 | 4.085 | 1 minute 27.4 seconds | |
| 315 | 1.582 | 73.17 | 26.97 | 3.635 | 2 minutes 25.5 seconds | |
| 316 | 1.577 | 84.60 | 30.05 | 3.134 | 4 minutes 12.9 seconds | |
| 317 | 1.555 | 94.62 | 32.63 | 2.757 | 6 minutes 22.5 seconds | |
| 318 | 1.572 | 106.7 | 35.65 | 2.454 | 10 minutes | 23.9° C. |
| 319 | .450 | 33.10 | 14.31 | 2.240 | 12 minutes | (a). |
| 320 | .439 | 34.33 | 14.76 | 2.109 | 16 minutes | |
| 321 | .437 | 34.71 | 14.90 | 2.076 | 22 minutes | |
| 322 | .439 | 36.81 | 15.66 | 1.969 | 23 minutes | |
| 323 | .437 | 36.38 | 15.50 | 1.983 | 26 minutes | |
| 324 | .286 | 23.75 | 10.70 | 1.976 | 27 minutes | (a). |
| 325 | .291 | 24.51 | 11.00 | 1.951 | 28 minutes | |
| 326 | .283 | 25.04 | 11.22 | 1.860 | 41 minutes | |
| 327 | .281 | 25.11 | 11.24 | 1.834 | 49 minutes | |
| 328 | .274 | 26.15 | 11.66 | 1.721 | 1 hour 18 minutes | |
| 329 | .273 | 27.04 | 12.00 | 1.658 | 1 hour 44 minutes | |
| 330 | .272 | 26.70 | 11.87 | 1.673 | 2 hours 5 minutes | |
| 331 | .282 | 24.45 | 10.98 | 1.890 | 2 hours 22 minutes | |
| 332 | .1475 | 48.5 | 19.63 | .506 | 2 hours 27.3 minutes | (b). |
| 333 | .0600 | 99.1 | 33.8 | .1014 | 2 hours 28 minutes | |
| 334 | .0546 | 106.1 | 35.5 | .0857 | 2 hours 28.5 minutes | |
| 335 | .0448 | 109.3 | 36.3 | .0680 | 2 hours 29 minutes | |
| 336 | .0961 | 96.4 | 33.1 | .1670 | 2 hours 32 minutes | |
| 337 | .0491 | 113.9 | 37.4 | .0713 | 2 hours 33 minutes | |
| 338 | .0437 | 117.9 | 38.4 | .0610 | 2 hours 34 minutes | |
| 339 | .0295 | 52.4 | 20.9 | .0939 | 2 hours 36 minutes | (a). |
| 340 | .0317 | 52.3 | 20.8 | .1009 | 2 hours 37 minutes | |
| 341 | .0437 | 48.5 | 19.7 | .1497 | 3 hours 3 minutes | |
| 342 | .0431 | 48.2 | 19.5 | .1489 | 3 hours 4 minutes | (c). | a Exchange current invariant for large change in overpotential verifies assumption of $\alpha=0.72$.
b At 19:07:10 (2 hr. 27.1 min.) dumped in new electrolyte: 0.2572 M LiClO$_4$ + 0.5395 M H$_2$O in PC (i.e. .9665 wt. percent H$_2$O in PC solvent).
c When cell was dismantled it was noted that too little clamping pressure allowed the rod to move out during slicing. Greater initial clamping pressure would have wedged the Li into the cell and not allowed the motion.
Note.—IR compensation used for all traces. Cell resistance approx. 150 ohm for traces 300–331, 275 ohm for traces 333–342.

For the low-current traces, the applied current was not constant, but the use of feedback-type IR compensation kept the errors small. This reflects high activation resistance (1000 to 2500 ohms for traces 333–342) compared to the external resistance of about 2000 ohms. The rapid rise in potential at the beginning of a pulse for these traces in part is due to this mismatch of resistances, but also may reflect an increased surface resistance, perhaps due to film formation or partial blockage of the surface. This is associated with the much lower exchange currents after water was added.

The time constant of the potential-time relaxation is approximately $R_{act.}C_{dl.}$, the product of the activation resistance $(E/i)$ and the double layer capacity. In dry PC, with a freshly-cut lithium surface (trace 308) the time constant is approximately 0.4 msec. With an activation resistance of 28.2 ohms, and a surface area of 0.32 cm.$^2$, this leads to a double-layer capacity of 45 $\mu$f./cm.$^2$, which is not unreasonable for a clean, rough metallic surface, in contact with a relatively concentrated salt solution. This capacity does not change appreciably for traces 300 to 331, even though the activation resistance changes by a factor of 4. Two hours after slicing (trace 330) the capacity is about 40 $\mu$f./cm.$^2$.

In the wet electrolyte, the capacity is greatly decreased: in the first few minutes after adding the new electrolyte, the time constant decreases from over 1 msec. to about 0.2 to 0.3 msec., and the activation resistance at the same time increases from about 100 ohms to 2000 ohms or more. This implies that the double layer capacity has decreased to about 0.3 $\mu$f./cm.$^2$; and such an observation certainly supports the hypothesis of film formation in the presence of water. Thirty minutes after adding the wet electrolyte (trace 342) the time constant has increased to 0.6 msec. and the activation resistance is still about 1000 ohms, corresponding to a capacity of less than 2 $\mu$f./cm.$^2$. This is comparable to the capacity obtained in the slightly damp electrolyte after 30 min. (trace 283: time constant 0.3 msec., $R_{act.}=556$ ohms, $C_{dl.}=1.7$ $\mu$f./cm.$^2$) and may represent a steady state situation which can be approached from either high or low water concentrations.

Low capacities can, of course, always be due to a smaller exposed surface area.

TABLE III

[Electrolyte: 0.2289 M LiClO$_4$ (K&K) in PC (distilled but not dried) (10 mm. water)]

| Trace No. | (ma.) | (mv.) | (mv.) | $i_a^o$ (ma./cm.$^2$) | Time | Comments |
|---|---|---|---|---|---|---|
| 257a | 1.081 | 21 | 10 | 8.19 | 1 second | |
| 258 | 1.064 | 43.1 | 17.8 | 4.10 | 4.5 seconds | |
| 259 | 1.053 | 50.4 | 20.3 | 3.48 | 7.5 seconds | |
| 260 | 1.048 | 56.7 | 22.2 | 3.09 | 10 seconds | |
| 261 | 1.042 | 59.4 | 23.0 | 2.94 | 13 seconds | |
| 262 | 1.037 | 68.5 | 25.7 | 2.54 | 16 seconds | Too bright. |
| 263 | 1.031 | 89.2 | 31.2 | 1.94 | 40 seconds | |
| 264 | 1.031 | 93.4 | 32.3 | 1.85 | 44 seconds | |
| 265 | 1.037 | 97.5 | 33.4 | 1.78 | 49 seconds | |
| 266 | 1.026 | 106.6 | 35.7 | 1.60 | 55 seconds | (a). |
| 271 | .977 | 168 | 50.8 | .872 | 2 minutes 51 seconds | |
| 272 | .944 | 174 | 52.3 | .801 | 3 minutes 19 seconds | |
| 273 | .939 | 204 | 59.6 | .624 | 4 minutes 49 seconds | 22.5° C. (b). |
| 276 | .873 | 273 | 77.6 | .335 | 9 minutes 6 seconds | |
| 277 | .873 | 280 | 79.5 | .315 | 9 minutes 58 seconds | |
| 278 | .840 | 328 | 92.7 | .206 | 14 minutes 48 seconds | |
| 279 | .807 | 328 | 92.7 | .198 | 15 minutes 49 seconds | Reverse current. |
| 280 | .807 | 309 | 87.6 | .230 | 17 minutes 4 seconds | (c). |
| 281 | .764 | 359 | 100 | .148 | 18 minutes 41 seconds | Reverse current. |
| 282 | .720 | 405 | 114 | .0967 | 24 minutes 38 seconds | Do. |
| 283 | .753 | 419 | 117 | .0907 | 25 minutes 50 seconds | Normal current. |
| 284 | .617 | 6227 | 174 | .0152 | 78 minutes | Slightly off scale. |
| 285 | .600 | 604 | 169 | .0170 | 80 minutes | Good. |
| 286 | .502 | 689 | 193 | .00735 | 87 minutes | (d). |
| 287 | .589 | 604 | 169 | .0167 | 88 minutes | Reverse current. |
| 288 | .589 | 609 | 170 | .0160 | 98 minutes | Normal current. |
| 289 | .0295 | 37.4 | 15.9 | .130 | 113 minutes | (e). |
| 290 | .671 | 878 | 246 | .0022 | 128 minutes | (f). |
| 291 | .676 | 872 | 244 | .0024 | 134 minutes | |
| 292 | 1.009 | 737 | 206 | .0102 | 14 hours 19 minutes | (g) 27.3° C. | a Traces 267–70 unreadable. Wires crossed up.
b Traces 274–75 blank. Bad film.
c Due to improper connections, current was on for about 1 min. and then turned off when pulse was fired. Possibly concentration polarization in cell. (normal current).
d Trace taken after electrolyte flushed around; withdrawn from hole with dropper and squirted back into cavity.
e Before this trace, old electrolyte removed. New electrolyte added consisting of 0.2289 M LiClO$_4$ and 0.414 M HMPA (i.e. 0.421 mole percent or 0.741 wt. percent HMPA in PC). Exchange current increased.
f Electrolyte removed after this trace, and cell was flushed with pure HMPA which had been dried over sieves. The pure HMPA may have reacted with the residual PC to form a passivating film of polypropylene glycol which could not be removed by dissolution of Li in the HMPA, because of the thickness of the film which inhibited transport of HMPA up to the metal.
g HMPA left in cell overnight. When cell was dismantled, Li was metallic but not bright. No thick film observed. Note that cell resistance increased by 60 ohms overnight (total R not known).

NOTE.—All traces taken with IR compensation. R is approx. 150 ohm.

TABLE IV

Experimental values for the two electrode cell Li(s)/ 1 M Li+, 1 M ClO4−, propylene carbonate/Li(s) at approx. 27° C. where $t_1$=approx. time after slicing of lithium, $t_2$=approx. time after filling cell with LiClO$_4$ electrolyte, $i$=current in milliamperes, E=potential across cell minus ohmic potential drop in volts, $i_a^o$ calculated for $\alpha=.72$.

| No. | $t^1$, hrs. | $t^2$, hrs. | $i$, ma. | E, mv. | R. ohm | $i_a^o$ cal'd ma./cm.$^2$ |
|---|---|---|---|---|---|---|
| 1 | 1.00 | .50 | .117 | 15.1 | 276 | 1.27 |
| 2 | 1.02 | .52 | .114 | 16.0 | 273 | 1.17 |
| 3 | 1.05 | .55 | .487 | 84.3 | 265 | .97 |
| 4 | 1.07 | .57 | .487 | 88.7 | 265 | .97 |
| 5 | 1.10 | .60 | 1.22 | 221 | 268 | .70? |
| 6 | 1.13 | .63 | 2.31 | 377 | 268 | .39? |
| 7 | 1.15 | .65 | 4.14 | 582 | 270 | .14? |
| 8 | 1.17 | .67 | .598 | 115 | 270 | .86 |
| 9 | 1.19 | .69 | .0662 | 12.9 | 272 | .84 |
| 10 | 1.22 | .72 | .0106 | 2.28 | 274 | .76 |
| 11 | 1.50 | 1.00 | .258 | 61.3 | 256 | .71 |
| 12 | 2 | 1.5 | .256 | 61.7 | 259 | .69 |
| 13 | 9 | 8.5 | .247 | 69.8 | 238 | .594 |
| 14 | 12 | 11.5 | .213 | 74.8 | 220 | .480 |
| 15 | 60 | 60 | .156 | 71.9 | 231 | .364 |
| 16 | 108 | 108 | .117 | 77.0 | 292 | .255 |
| 17 | 156 | 156 | .114 | 83.5 | 274 | .230 |
| 18 | 156 | 156 | .118 | 84.8 | 272 | .234 |
| 19 | 167 | 167 | .111 | 91.2 | 263 | .204 |

In obtaining the test results set forth in Tables I, II, III and IV, the propylene carbonate was distilled and stored in a Vacuum Atmospheres drybox until it was used. Ultra-pure LiClO$_4$ was used in the preparation of the electrolytes. In the experiments, approximately 1 M LiClO$_4$-propylene carbonate electrolyte was prepared by rough weighing the salt into a graduated flask.

A two-electrode lithium cell was filled with LiClO$_4$-propylene carbonate electrolyte inside the drybox. The lithium rod was sliced inside the drybox and polarization measurements were obtained with the experimental cell inside the drybox. The electrolyte and lithium electrodes were thus well sealed from atmospheric contamination at all times during the course of each experiment.

Polarization of the cell filled with the 1 M LiClO$_4$-propylene carbonate electrolyte showed an electrolyte resistance of 270 ohms, which corresponds to an electrolyte resistivity of 270 ohm-cm. (electrode area=.317 cm.$^2$, interelectrode distance=.317 cm.). This was quite low enough to allow determination of electron transfer exchange current density values.

Ambient temperature was 27.0±.5° C. during the first few hours of the experiment and 27±3° C. during the rest of the experiments.

Potential time curves of the response of the cell to galvanostatic pulses were recorded in the usual manner with the aid of a high impedance voltage follower, a dual beam oscilloscope (Tektronix type 565), and a Polaroid film. The photographs were read carefully with a scale, and these data were converted to current, potential and time values with the aid of a simple computer program containing the appropriate scaling factors. The experimental results are presented in Table IV.

The potential values are the sum of the potential drops at the anode and at the cathode of the cell. There is no a priori method of separating the potential E into its two components. In obtaining the results of this invention, a range of values of alpha, the cathodic transfer coefficient, were assumed and the behavior of the obtained exchange current density values were observed. The data seemed to "make sense" only if one assumes that the exchange current density decreased monotonically with time.

The conventions adopted for treatment of the data (in which all currents and potentials are positive) are as follows:
$E_a$=potential drop at the anode
$E_c$=potential drop at the cathode
I=observed current
$i$=observed current density
$i_a^o$=apparent electron transfer exchange current density
$\alpha$=cathodic transfer coefficient
$\beta=1-\alpha$=anodic transfer coefficient
$f=F/RT$
F=Faraday constant
R=gas constant
T=temperature on the Kelvin scale The total potential drop minus the IR drop is $$E_{obs}=E_a+E_c$$

and the Tafel equation takes the form $$i=i_a^o(e^{\alpha f E_c}-e^{-(1-\alpha)fE_c})$$
$$=i_a^o(e^{\beta f E_a}-e^{-(1-\beta)fE_a})$$
$$=i_a^o(e^{(1-\alpha)f(E_{obs.}-E_c)}-e^{-\alpha f(E_{obs.}-E_c)})$$

Wherever possible, exchange currents were calculated from the measured current and potential assuming the cathodic transfer coefficient to be 0.72.

Ohmic resistance of the electrolyte in the cell was obtained from the traces where IR compensation was not employed, but the most accurate measurements of activation overpotential were made with IR compensation from a feedback circuit, so that the actual current applied to the cell was used to control the compensating voltage. This considerably reduced the error in measurement of exchange current, and many values seem to be reproducible to better than 1 percent.

In general, the exchange current was quite large immediately after slicing and decreased rapidly with time. Careful drying of hte electrolyte (e.g. Table II) slowed down this decal, but did not eliminate it. The deliberate addition of 0.5 M (1 percent by weight) water to dry LiClO$_4$ propylene carbonate (Table II, traces 332–342) caused a sudden (less than 1 minute) decrease in the exchange current by nearly a factor of 20, but the final value reached after 1 hr. was not far from that obtained with an electrolyte containing only a slight amount (0.01 M) of water (Table III) after the same amount of time. These results lead to two important conclusions: First, the presence of trace amounts of water is critical in determining the rate of dissolution or deposition of Li in PC. Second, the final exchange current seems to be determined by an equilibrium "passivation" of the surface and is relatively independent of the initial water content of the electrolyte.

In Table I, results are shown for an electrolyte which was identical to that used for the experiments of Table II, except for the addition of 0.04557 M hexamethyl phosphoramide. The initial exchange currents are about 15 percent higher, but after 1 hour the hexamethyl phosphoramide containing electrolyte (Table I, trace 365) gave an exchange current of 2.8 ma./cm.$^2$, compared with 1.4 to 1.8 ma./cm.$^2$ for the undoped electrolyte (Table II, trace 327). Although this is not a dramatic effect, it is worthy of note that in the hexamethyl phosphoramide electrolyte the exchange current was still 1 ma./cm.$^2$ after 15 hours. This is more than 10 times as large as the value obtained for PC-LiClO$_4$ containing 0.01 M water after only 25 min. (Table III, trace 282).

While the principle of the present invention has been described with particularity, it should be understood that various changes and modifications may be made without departing from the spirit and scope of the invention.

What is claimed is:

1. A method for improving the discharge rate of lithium batteries having a lithium perchlorate-propylene carbonate electrolyte which comprises incorporating a small amount of hexamethyl phosphoramide in said electrolyte as a battery additive.

2. A method in accordance with claim 1 wherein said additive is in an amount of about 0.8 percent by weight.

3. In a battery, a lithium anode, a cathode and a non-aqueous electrolyte comprising lithium perchlorate, propylene carbonate and hexamethyl phosphoramide.

4. In the battery of claim 3 wherein said hexamethyl phosphoramide is present in an amount of about 0.8 percent by weight.

References Cited

UNITED STATES PATENTS

| | | | |
|---|---|---|---|
| 3,117,032 | 1/1964 | Panzer | 136—154 |
| 3,423,242 | 1/1969 | Meyers | 136—154 |

ALLEN B. CURTIS, Primary Examiner

H. A. FEELEY, Assistant Examiner

U.S. Cl. X.R.

136—83, 154